(12) United States Patent
Zhou et al.

(10) Patent No.: US 11,893,894 B2
(45) Date of Patent: Feb. 6, 2024

(54) LANDING MANAGEMENT DEVICE, LANDING MANAGEMENT METHOD, AND LANDING MANAGEMENT SYSTEM

(71) Applicant: Rakuten Group, Inc., Tokyo (JP)

(72) Inventors: Qingnan Zhou, Tokyo (JP); Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 488 days.

(21) Appl. No.: 17/056,801

(22) PCT Filed: Mar. 26, 2019

(86) PCT No.: PCT/JP2019/012788
§ 371 (c)(1),
(2) Date: Nov. 19, 2020

(87) PCT Pub. No.: WO2020/194495
PCT Pub. Date: Oct. 1, 2020

(65) Prior Publication Data
US 2021/0209953 A1    Jul. 8, 2021

(51) Int. Cl.
*G08G 5/00* (2006.01)
*B64C 39/02* (2023.01)
*G08G 5/02* (2006.01)

(52) U.S. Cl.
CPC ......... *G08G 5/0069* (2013.01); *B64C 39/024* (2013.01); *G08G 5/0013* (2013.01); *G08G 5/025* (2013.01); *G08G 5/0039* (2013.01)

(58) Field of Classification Search
CPC .... B64U 70/00; B64U 10/13; B64U 2201/00; G08G 5/003; G08G 5/0013; G08G 5/006; G08G 5/0069; G08G 5/0026; G08G 5/0034; G08G 5/0043; G08G 5/0082; B64C 39/024; H04B 7/18506
See application file for complete search history.

(56) References Cited

U.S. PATENT DOCUMENTS

| 2017/0197729 A1 | 7/2017 | Derenick et al. |
| 2019/0002122 A1 | 1/2019 | Ding et al. |
| 2020/0073412 A1* | 3/2020 | McNair ................. G05D 1/102 |

FOREIGN PATENT DOCUMENTS

| JP | 7-144699 A | 6/1995 |
| JP | 2017-510511 A | 4/2017 |
| JP | 2019-502594 A | 1/2019 |
| WO | 2017/109780 A1 | 6/2017 |
| WO | 2018/155700 A1 | 8/2018 |

OTHER PUBLICATIONS

International Search Report for PCT/JP2019/012788 dated Jun. 25, 2019 (PCT/ISA/210).

* cited by examiner

*Primary Examiner* — Shon G Foley
(74) *Attorney, Agent, or Firm* — Sughrue Mion, PLLC

(57) ABSTRACT

A landing management device sets a partition, in a predetermined landing area, on the basis of information of an unmanned aerial vehicle that lands on a landing area, the partition being obtained by virtually partitioning a part of the landing area, and transmits landing control information to a control device, in order to make the unmanned aerial vehicle land on a partial area corresponding to the partition. The control device controls landing of the unmanned aerial vehicle on the basis of the landing control information received from the landing management device.

14 Claims, 12 Drawing Sheets

FIG. 6
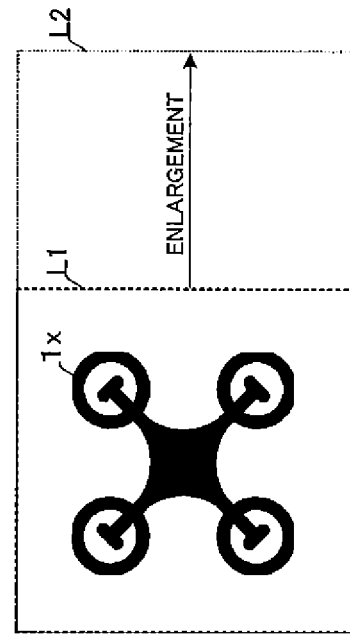
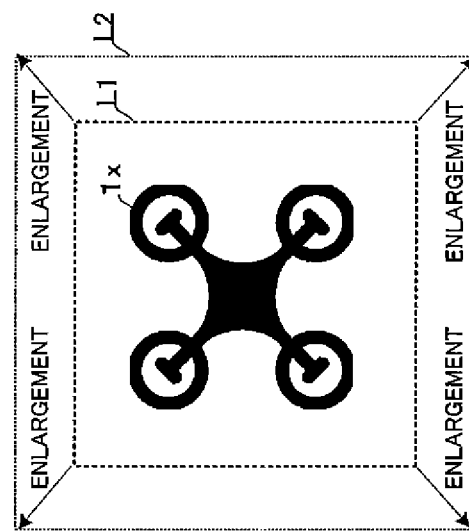

… (1) …

LANDING MANAGEMENT DEVICE, LANDING MANAGEMENT METHOD, AND LANDING MANAGEMENT SYSTEM

CROSS REFERENCE TO RELATED APPLICATIONS

This application is a National Stage of International Application No. PCT/JP2019/012788 filed Mar. 26, 2019.

TECHNICAL FIELD

The present invention relates to a technical field of a landing management system and the like to make an unmanned aerial vehicle land on a predetermined landing area.

BACKGROUND ART

Conventionally, there is a known technology in which a takeoff and landing facility (hereinafter referred to as a "port") for an unmanned aerial vehicle to take off and land is managed in response to a landing request from the unmanned aerial vehicle. For example, Patent Literature 1 discloses a technology in which a port management device determines availability of landing when a landing request is received from a flying object, and in a case where there is a different flying object in the port, the port management device does not permit landing at the port and makes the flying object wait above the port or move to a different port.

CITATION LIST

Patent Literature

Patent Literature 1: WO 2018/155700 A1

SUMMARY OF INVENTION

Technical Problem

However, in conventional art as described above, during a period from when one unmanned aerial vehicle lands at a port until the unmanned aerial vehicle takes off or is evacuated, it is difficult for another unmanned aerial vehicle to use the port, and therefore, there is a possibility that landing of unmanned aerial vehicles is inefficiently performed. Moreover, in a case of making the unmanned aerial vehicle wait above the port or move to a different port, it is inefficient from the viewpoints of battery power consumption and a waiting time of the unmanned aerial vehicle.

Therefore, one or more embodiments of the present invention are directed to provide a landing management device, a landing management method, and a landing management system capable of efficiently utilizing a landing area in a port used for landing of a plurality of unmanned aerial vehicles.

Solution to Problem

In response to the above issue, the invention according to an aspect of the disclosure is a landing management device including: a setting unit which sets a partition, in a predetermined landing area, on the basis of information of an unmanned aerial vehicle that lands on the landing area, the partition being obtained by virtually partitioning a part of the landing area; and a processing unit which performs processing to make the unmanned aerial vehicle land on a partial area corresponding to the partition. This makes it possible to efficiently utilize a landing area in a port used for landing of a plurality of unmanned aerial vehicles.

The invention according to an aspect of the disclosure is the landing management device, wherein the setting unit identifies a plane size suitable for landing of the unmanned aerial vehicle on the basis of the information of the unmanned aerial vehicle, and sets the partition according to the plane size in the landing area. This makes it possible to set the partitions according to the unmanned aerial vehicles of various sizes or shapes.

The invention according to an aspect of the disclosure is the landing management device further including an acquisition unit which acquires weather information in sky above or around the landing area, wherein the setting unit identifies the plane size further on the basis of the weather information. This makes it possible to set a more appropriate partition considering ease of landing on a partial area in accordance with the weather information.

The invention according to an aspect of the disclosure is the landing management device, wherein the information of the unmanned aerial vehicle includes information of at least one of a shape, a size, a type, and a model number of the unmanned aerial vehicle.

The invention according to an aspect of the disclosure is the landing management device, wherein the setting unit sets a new partition in the landing area so as not to overlap with a partition already set for a different unmanned aerial vehicle. This makes it possible to simultaneously use one landing area by a plurality of unmanned aerial vehicles without collision therebetween.

The invention according to an aspect of the disclosure is the landing management device, wherein in a case where a new partition cannot be set because there is a partition already set for a different unmanned aerial vehicle, the setting unit moves the partition already set for the different unmanned aerial vehicle inside the landing area and sets a new partition in the landing area after the movement. This makes it possible to respond to requests from the larger number of unmanned aerial vehicles, and to set the larger number of partitions in the one landing area.

The invention according to an aspect of the disclosure is the landing management device, wherein the setting unit determines, on the basis of a current position or scheduled landing time on the landing area of the different unmanned aerial vehicle, whether or not to move the partition already set for the different unmanned aerial vehicle. This makes it possible to take appropriate measures according to a case where an unmanned aerial vehicle that has reserved the partial area corresponding to the already set partition has already reached near the landing area and has little time to land.

The invention according to an aspect of the disclosure is the landing management device, wherein in a case where a scheduled period from when the unmanned aerial vehicle has landed on the partial area corresponding to the partition until the unmanned aerial vehicle takes off is a first predetermined period or more, the setting unit reduces the partition. This makes it possible to release a portion that has become available due to the reduction for landing of a different unmanned aerial vehicle.

The invention according to an aspect of the disclosure is the landing management device, wherein the setting unit reduces the partition only for a time zone that is after a second predetermined period from when the unmanned aerial vehicle has landed until a third predetermined period before the unmanned aerial vehicle is scheduled to take off. This makes it possible to release the portion that has become available due to the reduction with a sufficient time for landing of the different unmanned aerial vehicle.

The invention according to an aspect of the disclosure is the landing management device, further comprising an acquisition unit which acquires a size of an article recognized in the partial area after the unmanned aerial vehicle has landed on the partial area corresponding to the partition and the unmanned aerial vehicle is evacuated, wherein the setting unit reduces the partition on the basis of the size of the article. This makes it possible to release a portion that has become available due to the reduction for landing of a different unmanned aerial vehicle.

The invention according to an aspect of the disclosure is the landing management device, wherein in a case where a distance to the landing area from a current position of the unmanned aerial vehicle in flight becomes a predetermined distance or less, or in a case where a period from current time to scheduled landing time of the unmanned aerial vehicle on the landing area becomes a predetermined period or less, the setting unit sets the partition in the landing area. This makes it possible to set a more ideal partition for an unmanned aerial vehicle in flight.

The invention according to an aspect of the disclosure is the landing management device, wherein in a case where a distance to the landing area from a current position of the unmanned aerial vehicle in flight becomes a predetermined distance or less, or in a case where a period from current time to scheduled landing time of the unmanned aerial vehicle on the landing area becomes a predetermined period or less, the setting unit resets a new partition in the landing area instead of the partition already set. This makes it possible to set a more ideal partition for an unmanned aerial vehicle in flight.

The invention according to an aspect of the disclosure is the landing management device, wherein the setting unit sets a new partition in the landing area on the basis of a setting state of the partition in the landing area as of a reservation request time to be reserved by the unmanned aerial vehicle for landing. This makes it possible to respond to requests from the larger number of unmanned aerial vehicles, and to set the partition in the landing area for each future time zone.

The invention according to an aspect of the disclosure is the landing management device, wherein in a case where the new partition cannot be set because there is a partition already set for a different unmanned aerial vehicle, the setting unit shifts the reservation request time forward or backward and sets the new partition in the landing area on the basis of a setting state of the partition in the landing area as of the shifted reservation request time. This makes it possible to take a flexible action in response to a request from the unmanned aerial vehicle.

The invention according to an aspect of the disclosure is the landing management device, wherein a landing type of the unmanned aerial vehicle is a type in which the unmanned aerial vehicle can vertically land.

The invention according to an aspect of the disclosure is a landing management method of managing landing of an unmanned aerial vehicle by one or more computers, the method including: a step of setting a partition, in a predetermined landing area, on the basis of information of an unmanned aerial vehicle that lands on the landing area, the partition being obtained by virtually partitioning a part of the landing area; and a step of performing processing to make the unmanned aerial vehicle land on a partial area corresponding to the partition.

The invention according to an aspect of the disclosure is a landing management system comprising a landing management device which manages landing of an unmanned aerial vehicle, and a control device which controls landing of the unmanned aerial vehicle, wherein the landing management device includes: a setting unit which sets a partition, in a predetermined landing area, on the basis of information of an unmanned aerial vehicle that lands on the landing area, the partition being obtained by virtually partitioning a part of the landing area; and a transmission unit which transmits, to the control device, landing control information in order to make the unmanned aerial vehicle land on a partial area corresponding to the partition, and the control device controls landing of the unmanned aerial vehicle on the basis of the landing control information received from the landing management device.

Advantageous Effect of the Invention

According to one or more embodiments of the present invention, it is possible to efficiently utilize a landing area in a port used for landing of a plurality of unmanned aerial vehicles.

BRIEF DESCRIPTION OF THE DRAWINGS

FIG. 6 is a diagram illustrating examples of a plane size enlarged on the basis of weather information.

DESCRIPTION OF EMBODIMENTS

Hereinafter, an unmanned aerial vehicle system according to an embodiment of the present invention will be described with reference to the drawings.

[1. Outline of Configuration and Operation of Unmanned Aerial Vehicle System S]

Figure 1:
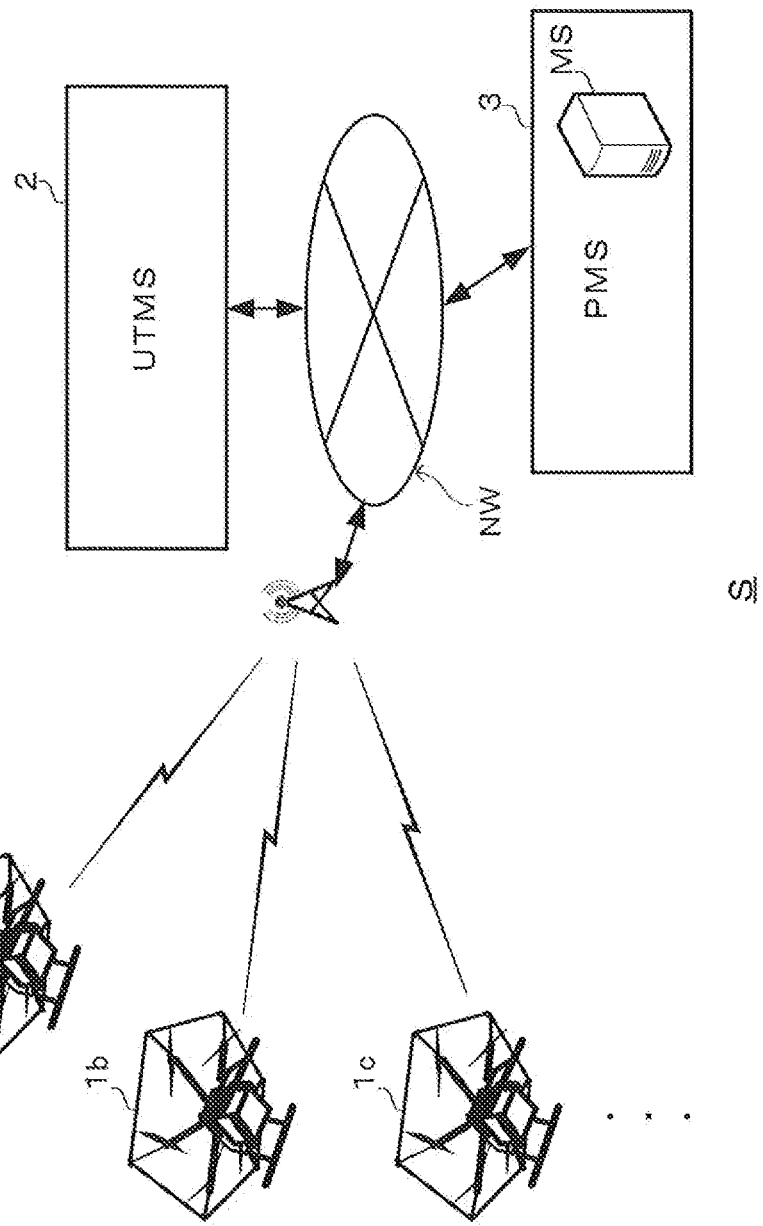
FIG. 1 is a diagram illustrating a schematic configuration example of an unmanned aerial vehicle system S.

First, an outline of a configuration and an operation of an unmanned aerial vehicle system S according to the present embodiment will be described with reference to FIG. 1. FIG. 1 is a view illustrating a schematic configuration example of the unmanned aerial vehicle system S. As illustrated in FIG. 1, the unmanned aerial vehicle system S includes a plurality of unmanned aerial vehicles (hereinafter referred to as "UAV (Unmanned Aerial Vehicle)s") 1a, 1b, 1c, . . . , a flight management system (hereinafter referred to as "UTMS (UAV Traffic Management System)") 2, and a port management system (hereinafter referred to as a "PMS (Port Management System)") 3. In the following description, a plurality of UAVs 1a, 1b, . . . will be collectively referred to as a UAV 1. The UAVs 1, the UTMS 2, and the PMS 3 can communicate with each other via a communication network NW. The communication network NW includes, for example, the Internet, a mobile communication network, a radio base station thereof, and the like. Incidentally, the UTMS 2 and the PMS 3 may be configured as one management system.

The UAV 1 can fly by remote operation or fly autonomously in the atmosphere. The UAV 1 is also called a drone or a multi-copter. The UAV 1 is used, for example, for transporting (for example, delivering) an article, for observing a situation on the ground, or the like. The article transported by the UAV 1 is also called cargo. In a case where the UAV 1 is used to deliver an article, the article is handed over to a recipient from the UAV 1 at the port where the UAV 1 lands. Moreover, in a case where an unmanned ground vehicle (hereinafter referred to as an "UGV (Unmanned Ground Vehicle)") that moves on the ground to deliver the article) is waiting at the port, the article is handed over from the UAV 1 to the UGV. Incidentally, the UAV 1 is managed by a GCS (Ground Control Station) and can be remotely operated by an operator from the ground. For example, the GCS is installed in a control terminal that can be connected to the communication network NW as an application. In this case, the operator is, for example, a person who operates the control terminal or a controller provided in the control terminal. Alternatively, the GCS may be systemized by a server or the like. In this case, the operator is, for example, a system administrator or a controller provided in the server.

The UTMS 2 includes one or more servers and the like. The UTMS 2 manages traffics and flights of the plurality of UAVs 1. The traffic management of the UAV 1 includes management of a traffic plan before flight of the UAV 1 and management and control of a flight status of the UAV 1 in flight. The traffic plan before the flight of the UAV 1 is a flight plan including a scheduled route from a departure place to a destination of the UAV 1, and the like. The flight plan may include a scheduled takeoff time, a scheduled passage time at each point on the scheduled route, and a scheduled landing time. The management and control of the flight status of the UAV 1 is performed on the basis of position information of the UAV 1. The position information of the UAV 1 indicates a current position (for example, latitude, longitude, and altitude) of the UAV 1. The current position of the UAV 1 is a flight position of the UAV 1 in flight. The management and control of the flight status of the UAV 1 may also be performed on the basis of the position information of the UAV 1, speed information of the UAV 1, and the like. The speed information of the UAV 1 indicates a flight speed of the UAV 1. For example, in a case where a flight plan application for the UAV 1 is received from the GCS, the UTMS 2 determines whether or not the flight plan satisfies a preliminarily set standard, and in a case where the flight plan satisfies the standard, the flight plan is approved. Moreover, the UTMS 2 performs air traffic control such as providing information and an instruction to the UAV 1. Examples of the information provided from the UTMS 2 to the UAV 1 include information of a safe flight route, information of a flight available area, and the like.

The PMS 3 includes one or more servers including a management server MS, and the like. The management server MS is an example of a landing management device. The PMS 3 manages a partition obtained by virtually partitioning a part of a landing area in a port. Here, the landing area is an area having a land size (the area) where the plurality of UAVs 1 can land. The "virtually partitioning a part of a landing area" means partitioning the part of the landing area recognized (for example, recognized as data indicating an actual size and a position) by a computer (server) is partitioned on the computer. Therefore, a partition is data of a partial area obtained by partitioning the part of the landing area on the computer. The UAV 1 is planned to land on the partial area corresponding to the partition (that is, the actual area in the landing area). Since a plurality of such partitions is set in a landing area at one port, the plurality of UAVs 1 can share and use one landing area at the same time.

By the way, it is conceivable to improve efficiency by, for example, providing a plurality of ports collectively (close to each other). However, since there are the UAVs 1 of various sizes and shapes, a size and a shape of a port required for landing is different depending on each of the UAVs 1. In a case of designing each of the plurality of ports in a manner such that all of the UAVs 1 can land, there are disadvantages that a size of each of the ports becomes extremely large, and a huge land is required. Alternatively, it is conceivable to provide a port for each of several sizes or each of patterns of shapes. However, in that case, there is inconvenience in that a port having a specific pattern can be used only by a specific UAV 1 or a port having a specific pattern cannot be used by a specific UAV 1. According to the present embodiment, such a problem is solved, and a port for a plurality of UAVs 1 to land can be more efficiently used.

[1-1. Outline of Configuration and Functions of UAV 1]

Figure 2:
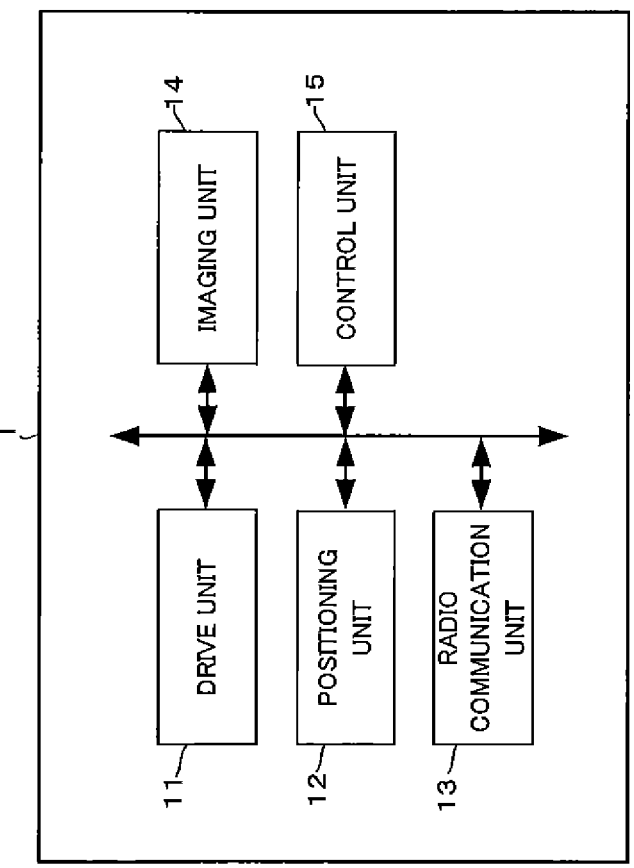
FIG. 2 is a diagram illustrating a schematic configuration example of an UAV 1.

Next, an outline of a configuration and functions of a UAV 1 will be described with reference to FIG. 2. FIG. 2 is a diagram illustrating a schematic configuration example of the UAV 1. As illustrated in FIG. 2, the UAV 1 includes a drive unit 11, a positioning unit 12, a radio communication unit 13, an imaging unit 14, a control unit 15, and the like. Incidentally, although not illustrated, the UAV 1 includes a rotor (propeller) that is a horizontal rotary blade, various sensors, a battery that supplies power to each of the units of the UAV 1, and the like. The various sensors used for flight control of the UAV 1 include a barometric sensor, a three-axis acceleration sensor, a geomagnetic sensor, and the like. Detection information detected by the various sensors is output to the control unit 15. The detection information detected by the barometric sensor is used to calculate a flight speed of the UAV 1.

The drive unit 11 includes a motor, a rotating shaft, and the like. The drive unit 11 rotates a plurality of rotors by a motor, a rotating shaft, and the like that are driven in accordance with a control signal output from the control unit 15. The positioning unit 12 includes a radio wave receiver, an altitude sensor, and the like. For example, the positioning unit 12 receives, by the radio wave receiver, a radio wave sent from a satellite of a GNSS (Global Navigation Satellite System) and detects a current position (latitude and longitude) in a horizontal direction of the UAV 1 on the basis of the radio wave. Incidentally, the current position in the horizontal direction of the UAV 1 may be corrected on the basis of an image captured by the imaging unit 14 or a radio wave sent from the radio base station.

Further, the positioning unit 12 may detect the current position (altitude) in a vertical direction of the UAV 1 with the altitude sensor. The position information indicating the current position detected by the positioning unit 12 is output to the control unit 15. Incidentally, the position information of the UAV 1 can be applied to the present embodiment even in a case where the position information indicates the current position (latitude and longitude) in the horizontal direction of the UAV 1 (that is, two-dimensional position information). The radio communication unit 13 controls communication performed via the communication network NW. The imaging unit 14 includes a camera and the like. The imaging unit 14 continuously captures images of a real space within a range included in an angle of view of the camera (a periphery of the UAV 1). Image information captured by the imaging unit 14 is output to the control unit 15.

The control unit 15 includes a central processing unit (CPU) which is a processor, a read only memory (ROM), a random access memory (RAM), a non-volatile memory, and the like. The control unit 15 executes various kinds of control for the UAV 1 in accordance with a control program (program code group) stored in, for example, the ROM or the non-volatile memory. The various kinds of control include takeoff control, flight control, and landing control. The control unit 15 or the GCS is an example of a control device that controls landing of the UAV 1, and a landing management system includes the control device and the management server MS. In the flight control and the landing control, the position information acquired from the positioning unit 12, the image information acquired from the imaging unit 14, the detection information acquired from the various sensors, the flight plan information indicating a pre-registered flight plan, landing control information received from the PMS 3 or the like, and so on are used to control a rotation speed of the rotor, and a position, a posture, and a traveling direction of the UAV 1. By this configuration, the UAV 1 can fly autonomously from a departure place to a destination (port) and can land vertically from the sky on a partial area inside a landing area in the port.

Here, the landing control information is information to make a UAV 1 land on a partial area corresponding to a partition set for the UAV 1, and includes position information of the partial area, for example. Moreover, the autonomous flight of the UAV 1 is not limited to the autonomous flight performed under the flight control of the control unit 15 provided in the UAV 1, and the autonomous flight of the UAV 1 also includes, for example, autonomous flight performed by autonomous control as the entire unmanned aerial vehicle system S. Incidentally, the control unit 15 can also perform the flight control in accordance with an instruction signal from the control terminal. Additionally, during the flight of the UAV 1, the control unit 15 periodically transmits, to the UTMS 2 via the radio communication unit 13, at least one of the position information of the UAV 1 and the speed information indicating the flight speed of the UAV 1 together with an aircraft ID of the UAV 1. The aircraft ID of the UAV 1 and at least one of the position information and the speed information may be transmitted to the UTMS 2 from the UAV 1 via the GCS.

[1-2. Outline of Configuration and Functions of Management Server MS]

Figure 3:
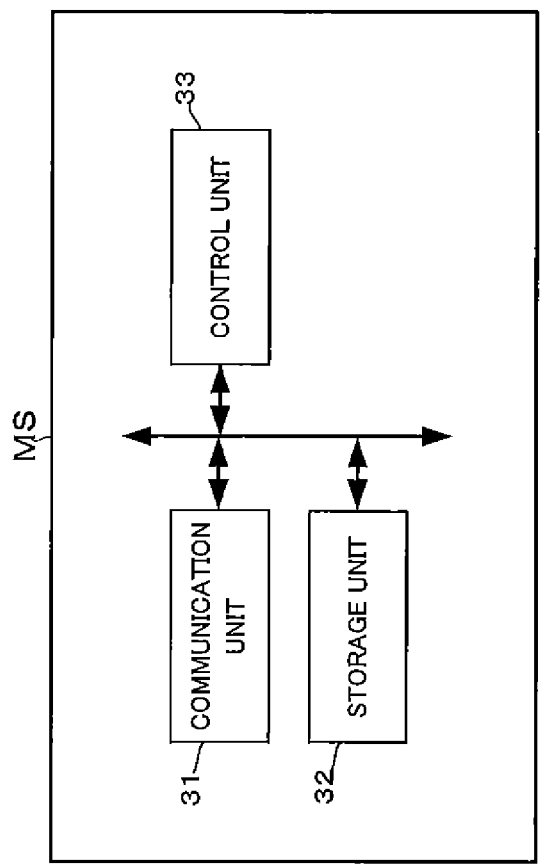
FIG. 3 is a diagram illustrating a schematic configuration example of a management server MS.
Figure 4:
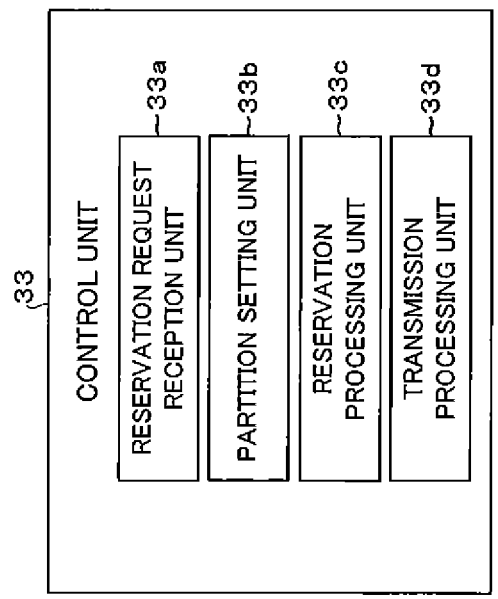
FIG. 4 is a diagram illustrating an example of functional blocks in a control unit 33.

Next, an outline of a configuration and functions of the management server MS will be described with reference to FIGS. 3 and 4. FIG. 3 is a diagram illustrating a schematic configuration example of the management server MS. As illustrated in FIG. 3, the management server MS includes a communication unit 31, a storage unit 32, a control unit 33, and the like. The communication unit 31 controls communication performed via the communication network NW. The storage unit 32 includes, for example, a hard disk drive, and the like. The storage unit 32 stores, in a manner correlated to each other, size information of a partial area corresponding to a set partition, position information of the partial area, reservation information of the partial area, and the like. Here, a partition has a shape (in other words, a shape of a partial area) not particularly limited, but size information of a partial area in a case of having a quadrangular shape is preferably represented by a vertical dimension and a horizontal dimension, and size information of a partial area in a case of having a circular shape is preferably represented by a radius. The position information of a partial area is represented, for example, by latitude and longitude at a center point of the partial area or a peripheral region thereof. The reservation information of a partial area includes an aircraft ID of a UAV 1 that reserves the partial area (landing reservation), reservation date and time, a landing situation of the UAV 1, and the like. The aircraft ID of the UAV 1 is identification information that identifies the UAV 1. The reservation date and time may be a reservation date and a reservation time zone (start time (e.g., 10 o'clock) to end time (e.g., 13 o'clock)). The landing situation of the UAV 1 indicates whether or not the UAV 1 has landed on the reserved partial area.

Incidentally, a case where the UAV 1 is evacuated (retreated) from the partial area by, for example, a staff member after landing on the partial area; and a case where the UAV 1 takes off from the partial area. In the case where the UAV 1 takes off from the partial area, reservation information of the partial area includes scheduled takeoff time of the UAV 1. Moreover, in the case where the UAV 1 is evacuated or takes off from the partial area after the landing, the size information, the position information, and the reservation information of the partial area are deleted from the storage unit 32. By this configuration, the partial area is released for landing of a different UAV 1, and a new partition can be set in the portion. Incidentally, a fact that occupation of the partition is ended may be recorded instead of deleting the size information, the position information, and the reservation information of the partial area from the storage unit 32, and the partial area corresponding to the partition may be released as an available area even before the end time of the reservation.

The control unit 33 includes a CPU which is a processor, a ROM, a RAM, a non-volatile memory, and the like. FIG. 4 is a diagram illustrating an example of functional blocks in the control unit 33. As illustrated in FIG. 4, the control unit 33 functions as a reservation request reception unit 33a, a partition setting unit 33b, a reservation processing unit 33c, and a transmission processing unit 33d in accordance with a program stored in, for example, the ROM or the non-volatile memory. Incidentally, the partition setting unit 33b is an example of an acquisition unit and a setting unit of the landing management device. The transmission processing unit 33d is an example of a processing unit of the landing management device.

The reservation request reception unit 33a receives a reservation request for a partial area from a UAV 1 or the GCS. This reservation request includes an aircraft ID of the UAV 1 related to the reservation request, and specific information, reservation date and time, scheduled landing time, and the like of the UAV 1. The specific information of the UAV 1 is information of at least one of a shape (e.g., square shape and rectangular shape), a size (e.g., length× width×height), a type (aircraft model), and a model number of the UAV 1. The reservation date and time are selected in accordance with, for example, an instruction from the operator of the UAV 1. Incidentally, there is a case where the reservation request includes approach direction information indicating an approach direction of the UAV 1 to a landing area. Also, the reservation request may include the scheduled takeoff time of the UAV 1.

The partition setting unit 33b sets, as a landing area, a partition obtained by virtually partitioning a part of the landing area in the port in response to a reservation request received by a reservation request reception unit 43a. For example, the partition setting unit 33b preferably identifies, on the basis of the specific information of the UAV 1, a plane size suitable (ideal) for landing of the UAV 1, and sets a partition according to the identified plane size in the landing area. Since there are UAVs 1 of various sizes and shapes, a plane size corresponding to each of the UAVs 1 is identified. Therefore, it is possible to set a partition according to each of the UAVs 1 of the various sizes and shapes. Here, the "plane size suitable for landing" means a plane size having a land size that is not unnecessarily wide for landing of one UAV 1 (in order to enable the larger number of UAVs 1 to land inside the landing area) and is large enough to allow one UAV 1 to land while having a certain degree of sufficient room (to land with some margin).

Figure 5:
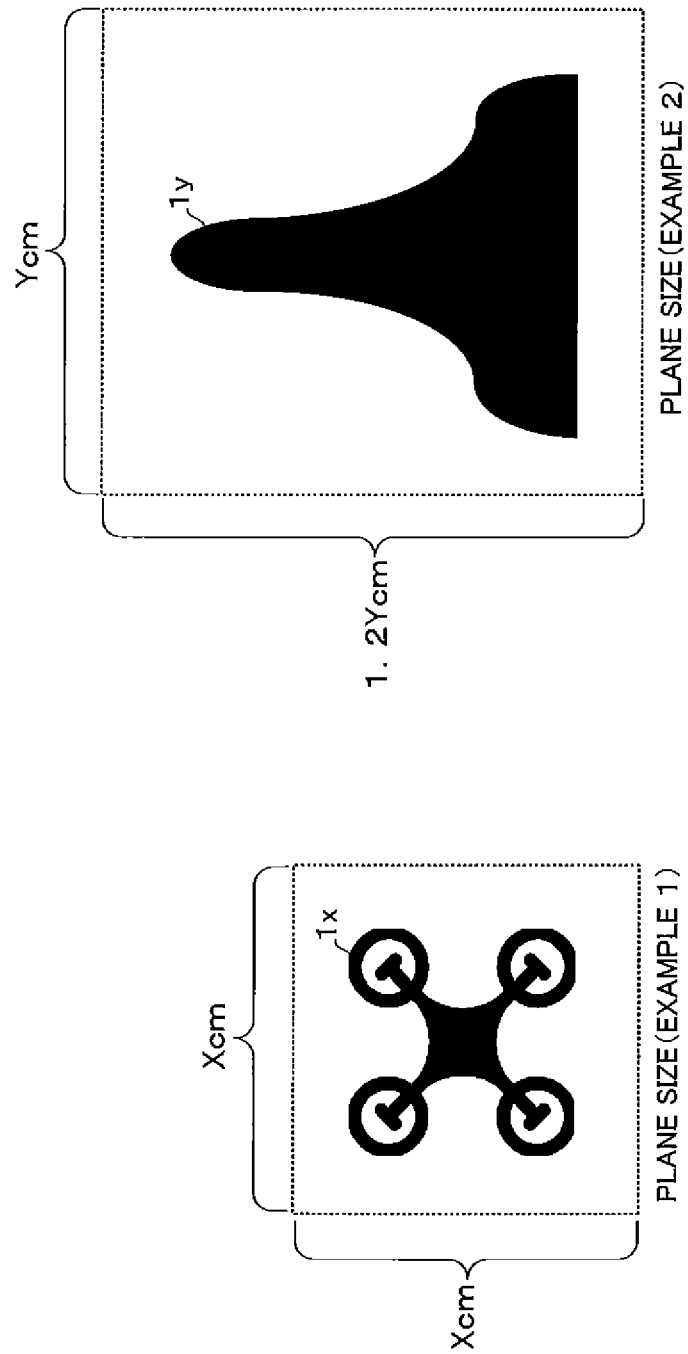
FIG. 5 is a diagram illustrating an example of a plane size suitable for landing of a UAV 1.

FIG. 5 is a diagram illustrating an example of a plane size suitable for landing of a UAV 1. Example 1 illustrated in FIG. 5 has a plane size (length X cm×width X cm) suitable for landing of a UAV 1x and has a quadrangular shape, but may also have a pentagonal or higher polygonal shape or a circular shape. On the other hand, Example 2 illustrated in FIG. 5 has a plane size (length 1.2×Y cm×width Y cm) suitable for landing of a UAV 1y and has a rectangular shape, but may have a triangular shape or an elliptical shape. Thus, the plane size may be varied by a shape of each UAV 1 (that is, the shape viewed from the sky). Moreover, in a case where a size of a UAV 1 permitted to land on the landing area is fixed per shape, a plane size corresponding to each shape (e.g., a rectangular shape) of the UAV 1 is identified. In this case, the size of the UAV 1 may not be included in the reservation request. Alternatively, in a case where a size or a shape of a UAV 1 can be identified from a type or a model number of the UAV 1, a plane size corresponding to the size or the shape identified from the type or the model number of the UAV 1 is identified. In this case also, the size and the shape of the UAV 1 are not necessarily included in the reservation request. Incidentally, a shape and a size of each UAV 1 may also be identified by, for example, recognizing (sensing) the UAV 1 with a sensor such as a camera installed in a periphery of a port. For example, when a landing request is made from a UAV 1, a shape and a size of the UAV 1 recognized by the sensor is identified by the control unit 33. In this case also, the size and the shape of the UAV 1 are not necessarily included in the reservation request.

Moreover, the partition setting unit 33b may acquire, for example, weather information in the sky above or around a landing area at scheduled landing time and may identify a plane size additionally on the basis of the acquired weather information. That is, the partition setting unit 33b adjusts (enlarges or reduces), on the basis of the weather information, the plane size identified on the basis of the specific information of the UAV 1, and then sets a partition according to the adjusted plane size in the landing area. According to this configuration, a more appropriate partition considering convenience of landing on the partial area can be set in accordance with the weather information. Examples of the weather information can include a wind speed, a wind direction, rain, snow, and the like. Here, the wind speed and the wind direction are represented by, for example, an average during several minutes. The wind direction is represented by, for example, an azimuth (e.g., north, southwest, northeast, or the like). Incidentally, the weather information may be obtained from information sensed by a sensor installed in a periphery of a port, or may be obtained from a server that manages weather forecast several days ahead.

FIG. 6 is a diagram illustrating examples of a plane size enlarged on the basis of weather information. For example, in a case of enlargement based on the wind speed, the faster (higher) the wind speed is, at a larger enlargement factor (magnification) an identified plane size is enlarged like Example 1 illustrated in FIG. 6 (that is, the plane size indicated by broken lines L1 is enlarged to a plane size indicated by broken lines L2 in Example 1 illustrated in FIG. 6). Alternatively, in a case where the wind speed is a threshold or higher, the identified plane size may be enlarged at a predetermined ratio. Moreover, in a case of enlargement based on the wind direction, an identified plane size is enlarged at the predetermined ratio in the wind direction (for example, in an east direction in a case where the wind direction is east) like Example 2 illustrated in FIG. 6 (that is, the plane size indicated by broken lines L1 is enlarged to a plane size indicated by broken lines L2 in Example 2 illustrated in FIG. 6). Moreover, in a case of enlargement based on the wind speed and the wind direction, the faster the wind speed is, at the larger enlargement factor the identified plane size is enlarged in the direction of the wind direction. Alternatively, in the case where the wind speed is the threshold or higher, the identified plane size is enlarged in the wind direction at the predetermined ratio. Moreover, in a case of rain or snow, the identified plane size may be enlarged at the predetermined ratio.

Figure 7:
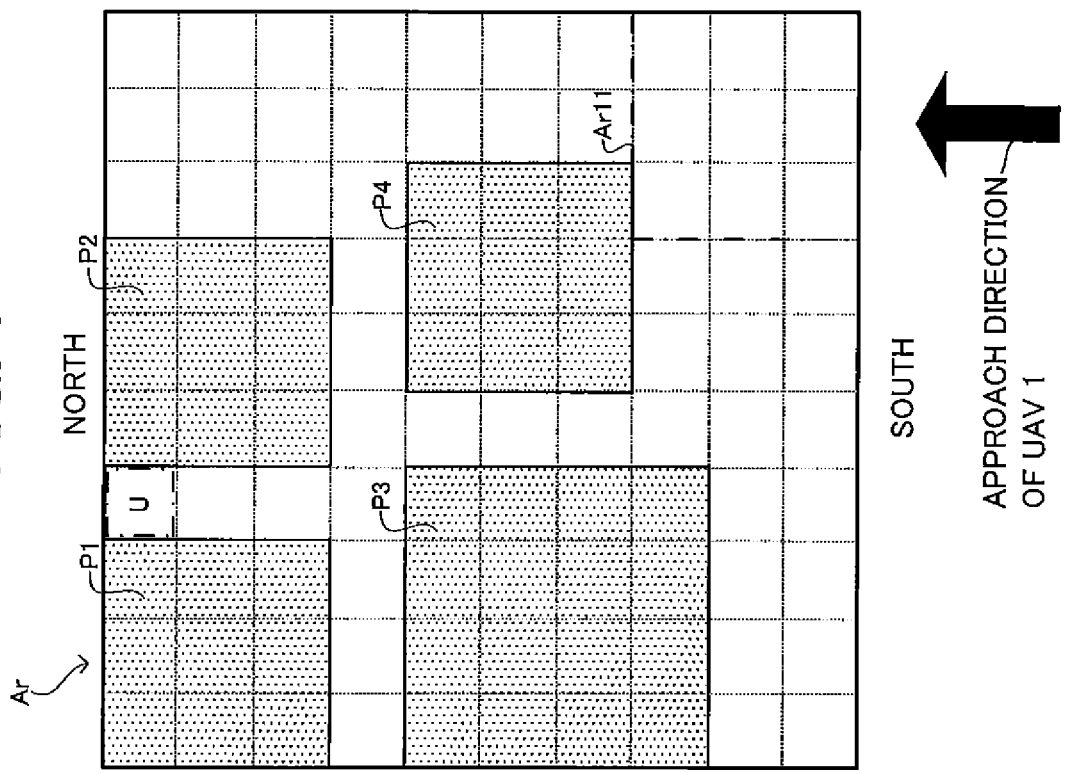
FIG. 7 is a conceptual diagram illustrating partitions set in a landing area Ar.

FIG. 7 is a conceptual diagram illustrating partitions set in a landing area Ar. A landing area Ar illustrated in FIG. 7 has a plurality of unit areas U obtained by virtually partitioning the landing area in advance at predetermined intervals, but when a reservation request is made, a partition according to a plane size described above may be dynamically partitioned in the landing area Ar. In an example of FIG. 7, an upper side of the landing area Ar is defined as north and a lower side is defined as south. In the example of FIG. 7, it is assumed that a partition P1 is set for a UAV 1a, a partition P2 is set for a UAV 1b, a partition P3 is set for a UAV 1c, and a partition P4 is set for a UAV 1d. For example, the partition P1 is set at an upper left end portion of the landing area Ar, and then the partition P2 is set on the right side thereof. When the partition P1 is thus set for the UAV 1a, a partial area corresponding to the partition P1 is reserved by the UAV 1a, and when the partition P2 is set for the UAV 1b, a partial area corresponding to the partition P2 is reserved by the UAV 1b. After that, in the example of FIG. 7, the partition P3 is set at a left end portion below the partition P1, and then the partition P4 is set on the right side thereof. When the partition P3 is thus set for the UAV 1c, a partial area corresponding to the partition P3 is reserved by the UAV 1c, and when the partition P4 is set for the UAV 1d, a partial area corresponding to the partition P4 is reserved by the UAV 1d.

For example, in a case where a reservation request for the partial area for the UAV 1b to land is received, the partition setting unit 33b sets, in the landing area Ar, the new partition P2 for the UAV 1b so as not to overlap with the partition P1 already set for the UAV 1a. That is, a portion corresponding to a partial area not reserved by a different UAV 1 (that is a partial area not currently used) is set as the new partition.

Thus, since the new partition is set so as not to overlap with the partition already set, one landing area Ar can be used by the plurality of UAVs 1 at the same time without collision therebetween. Moreover, in the example of FIG. 7, since the partitions are set preferentially from the end portion of the landing area Ar, the partitions can be set efficiently without a useless portion. Incidentally, a position of a portion set as a partition in the landing area Ar can be managed by position information of a partial area corresponding to the partition. Moreover, in the example of FIG. 7, a space corresponding to one unit area U is provided in each of an interval between the partition P1 and the partition P2, an interval between the partition P1 and the partition P3, an interval between the partition P2 and the partition P4, and an interval between the partition P3 and the partition P4. Such a space can be used for partition movement described later, but the partitions may also be set without providing the space.

Moreover, the partition setting unit 33b may preferentially set, on the basis of approach direction information included in a reservation request, a partition located at a portion closer in an approach direction to the landing area Ar of a UAV 1. For example, in a case where the UAV 1 approaches to the landing area Ar from a south direction (an arrow direction illustrated in FIG. 7), a partition may be preferentially set at a lower right end portion Ar11 of the landing area Ar. By this configuration, the UAV 1 can land on the landing area Ar without making a detour around the landing area Ar and without changing a scheduled route approved by the UTMS 2. Incidentally, in a case where a partition is already set in the lower right end portion Ar11 of the landing area Ar, the partition setting unit 33b virtually moves, inside the landing area Ar, the partition already set and may set a new partition after the movement.

By the way, in a case where a new partition cannot be set because there is a partition already set (that is, in a case where there is no space (vacant space) for the above-described plane size in the landing area Ar), it is not possible to respond to a new reservation request. Therefore, in this case, the partition setting unit 33b may virtually move, inside the landing area Ar, the partition already set and may set a new partition after the movement. That is, a space corresponding to the plane size is secured in the landing area Ar by moving the partition already set, and the new partition is set in the secured space.

Figure 8:
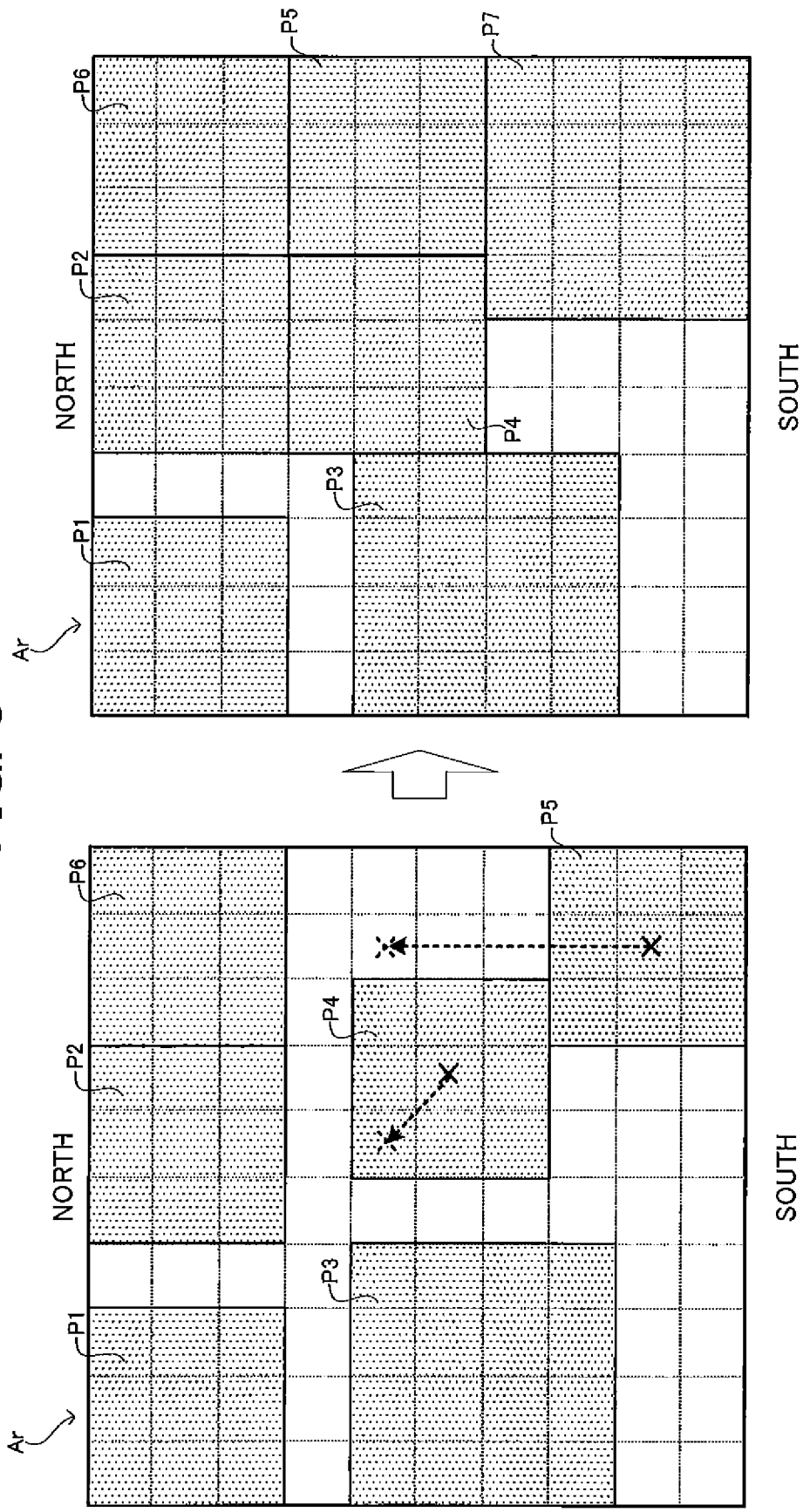
FIG. 8 is a conceptual diagram illustrating a state in which a new partition is set by moving, inside a landing area Ar, a partition already set.

FIG. 8 is a conceptual diagram illustrating a state in which a new partition is set by moving, inside a landing area Ar, a partition already set. As illustrated on a left side of FIG. 8, a partition P4 is moved diagonally in an upper left direction and a partition P5 is moved in a straight upper direction, and therefore, a new partition P7 can be set as illustrated on a right side of FIG. 8. According to this configuration, even in a case where a new partition cannot be set at the time of receiving a new reservation request because there is a partition already set, it is possible to respond to the new reservation request and the larger number of partitions can be set in one landing area Ar. However, in a case where a UAV 1 that has already reserved a partial area corresponding to a partition already set reaches near the landing area Ar and there is not much time remaining before landing thereof, or the like, it is desirable not to move the partitions already set. Therefore, the partition setting unit 33b preferably determines, on the basis of a current position of the UAV 1 or scheduled landing time on the landing area Ar, whether or not to move the partition already set for the UAV 1. For example, in a case where a distance from a current position of a UAV 1 to the landing area Ar is a predetermined distance (e.g., 500 to 1000 m) or less, or in a case where a period from the current time to the scheduled landing time of the UAV 1 on the landing area Ar is a predetermined period (e.g., 5 to 10 minutes), the partition already set for the UAV 1 is not moved.

The reservation processing unit 33c performs reservation processing of reserving a partial area corresponding to a partition set by the partition setting unit 33b. In this reservation processing, the partial area for landing of the UAV 1 is reserved by the reservation processing unit 33c storing, in a correlated manner, size information of a partial area corresponding to a partition set by the partition setting unit 33b, position information of the partial area, and reservation information of the partial area. Here, the reservation information of the partial area includes an aircraft ID of the UAV 1, reservation date and time, and a landing situation of the UAV 1 related to the reservation request. The landing situation included in the reservation information is "not landed yet" at the time of reservation, but is updated to "landed" when the UAV 1 has landed. Incidentally, in a case where scheduled takeoff time of the UAV 1 is included in the reservation request, the scheduled takeoff time of the UAV 1 is to be included in the reservation information of the partial area.

The transmission processing unit 33d performs transmission processing to make the UAV 1 land on the partial area corresponding to the partition set by the partition setting unit 33b (that is, the partial area reserved by the UAV 1). This transmission processing may be direct transmission processing or may be indirect transmission processing. In the direct transmission processing, the transmission processing unit 33d transmits, to the UAV 1 via the communication network NW, landing control information including position information of the partial area where the UAV 1 is made to land. With this configuration, the UAV 1 lands on the partial area under the control based on the landing control information. On the other hand, in the indirect transmission processing, the transmission processing unit 33d transmits, to the GCS or the UTMS 2 via the communication network NW, the landing control information including the position information of the partial area where the UAV 1 is made to land. With this configuration, the GCS or the UTMS 2 makes the UAV 1 land on the partial area under the control based on the landing control information. Incidentally, the GCS or the UTMS 2 may transmit the received landing control information to the UAV 1.

[2. Exemplary Operation of Unmanned Aerial Vehicle System S]

Figure 9:
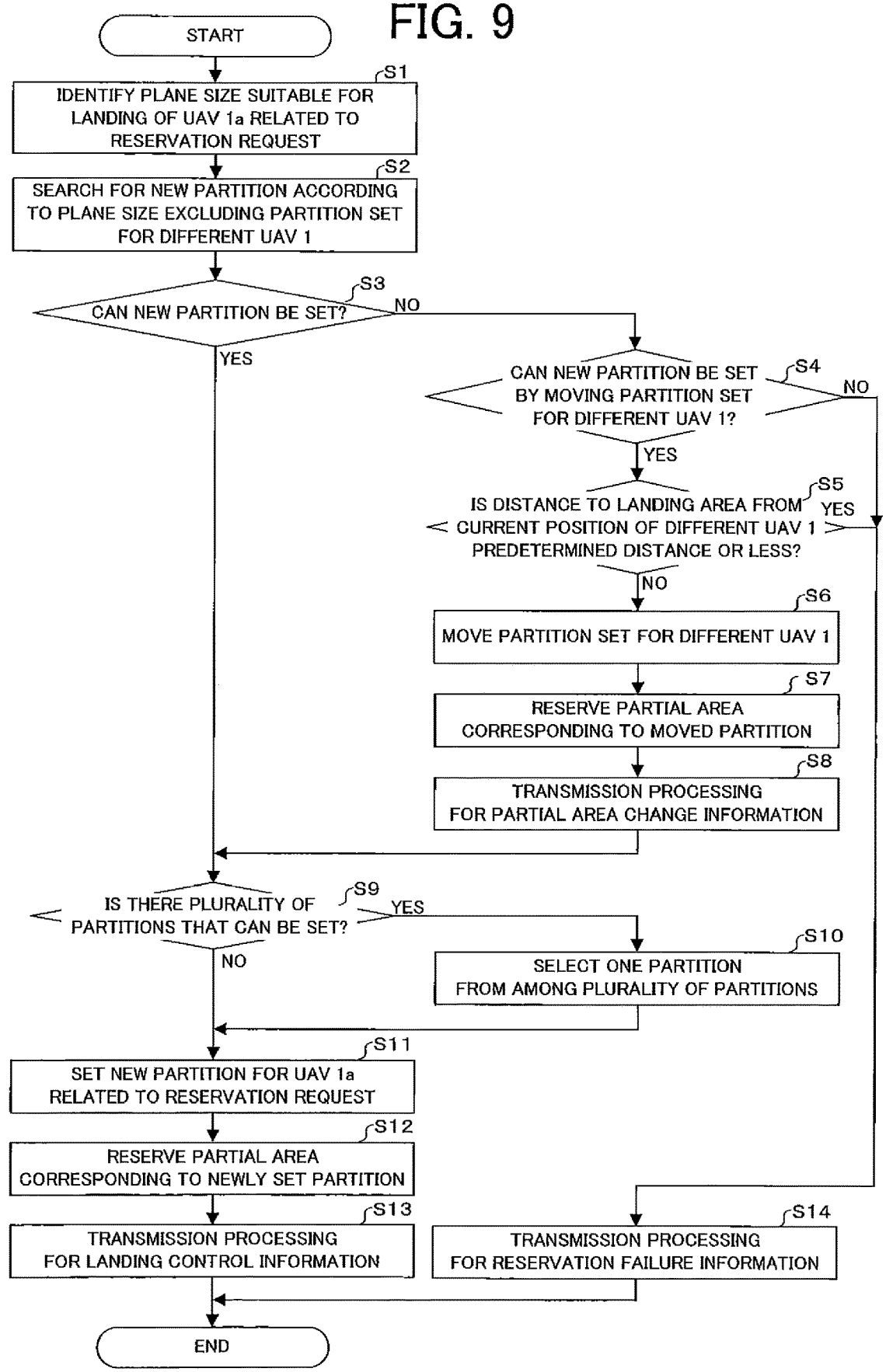
FIG. 9 is a flowchart illustrating an example of processing executed by a management server MS.

Next, an exemplary operation of the unmanned aerial vehicle system S according to the present embodiment will be described with reference to FIG. 9. FIG. 9 is a flowchart illustrating an example of processing executed by the management server MS. The processing illustrated in FIG. 9 is started in a case where, for example, a reservation request (partial area reservation request) transmitted from a UAV 1a or the GCS is received by the management server MS. This reservation request may be transmitted before the UAV 1a starts the flight or may be transmitted during the flight of the UAV 1a. In the latter case, the UAV 1a or the GCS preferably transmits the reservation request in a case where a distance from a current position of the UAV 1a to a landing area Ar becomes a predetermined distance (e.g., 500 to 1000 m) or less, or in a case where a period from the current time to scheduled landing time of the UAV 1a on the landing area Ar becomes a predetermined period (e.g., 5 to 10 minutes) or less. According to this configuration, even in a case where there is no space available for landing of the UAV 1a in the landing area Ar and reservation cannot be made for a partial area when the UAV 1a starts the flight, a partition for the UAV 1a can be set in the landing area Ar and the UAV 1a can reserve a partial area corresponding to the set partition, if a space can be made by evacuation of a different UAV 1 from the landing area Ar during a period until the UAV 1a reaches near the landing area Ar.

Alternatively, the reservation request may be transmitted both before the UAV 1a starts the flight and during the flight of the UAV 1a (for example, when the UAV 1a reaches near the landing area Ar). In this case, the reservation request before start of the flight is to be a provisional reservation request, and the reservation request during the flight is to be a formal reservation request. According to this configuration, even in a case where a partial area cannot be reserved at the time of the reservation request before start of the flight or in a case where it is necessary to make a detour around the landing area Ar even though the reservation could be made, a partition (for example, a partition for which the UAV a does not need to make a detour) more ideal for the UAV 1a can be set in the landing area Ar and the UAV 1a can reserve a partial area corresponding to the set partition, if a space can be made by evacuation of a different UAV 1 from the landing area Ar during the period until the UAV 1a reaches near the landing area Ar.

When the processing illustrated in FIG. 9 is started, the management server MS has the partition setting unit 33b identify a plane size suitable for landing of the UAV 1a as described above on the basis of specific information and the like of the UAV 1a related to the reservation request (Step S1). Next, the management server MS searches the landing area Ar for a new partition according to the plane size identified in step S1 (for example, a partition that meets the plane size) (step S2). That is, the search is made for a new partition according to the plane size on the basis of a partition setting state in the landing area Ar at the time of receiving the reservation request. At this time, a partition already set for a different UAV 1 is excluded from a search range (in order to avoid overlapping). Moreover, in a case where a partition is already set for the UAV 1a related to the reservation request (that is, set by a provisional reservation request), the search is made for a new partition including this partition without excluding the same.

Next, the management server MS determines, from the search result in step S2, whether or not the new partition can be set in the landing area Ar (step S3). In a case where no partition according to the plane size can be extracted through the search in step S2, the management server MS determines that the partition cannot be set in the landing area Ar (step S3: NO), and the processing proceeds to step S4. On the other hand, in a case where the partition according to the plane size can be extracted through the search in step S2, the management server MS determines that the partition can be set in the landing area Ar (step S3: YES), and the processing proceeds to step S9.

In step S4, the management server MS determines whether or not a space of the above-described plane size or larger can be secured and a new partition can be set by moving a partition set for a different UAV 1 (for example, executing a movement simulation of the partition set for the different UAV 1). Incidentally, there may be a case where movement of a plurality of partitions is required in order to secure a space of the plane size or larger. In a case where the management server MS determines that the new partition can be set by moving the partition set for the different UAV 1 (step S4: YES), the processing proceeds to step S5. On the other hand, in a case where the management server MS determines that the new partition cannot be set even though the partition set for the different UAV 1 is moved (step S4: NO), the processing proceeds to step S14.

In step S5, the management server MS calculates a distance to the landing area from a current position of the different UAV 1 whose partition is to be moved, and determines whether or not the calculated distance is a predetermined distance or less. Here, position information indicating the current position of the different UAV 1 may be acquired from the UTMS 2 by the management server MS transmitting an aircraft ID of this different UAV 1 to the UTMS 2, or may be acquired from this different UAV 1 or the GCS. Alternatively, in step S5, the management server MS may calculate a period from the current time to scheduled landing time of the different UAV 1 on the landing area Ar, and may determine whether or not the calculated period is a predetermined period or less. Here, information indicating the scheduled landing time may be acquired from the UTMS 2 by the management server MS transmitting the aircraft ID of this different UAV 1 to the UTMS 2, or may be acquired from this different UAV 1 or the GCS.

Then, in a case where it is determined that the distance to the landing area from the current position of the different UAV 1 whose partition is to be moved is the predetermined distance of less (step S5: NO), the processing proceeds to step S6, and in a case where it is determined that the distance to the landing area from the current position of the different UAV 1 is the predetermined distance or less (step S5: YES), the processing proceeds to step S14. Alternatively, in a case where it is determined that the period from the current time to the scheduled landing time of the different UAV 1 on the landing area Ar is not the predetermined period or less (step S5: NO), the processing proceeds to step S6, and in a case where it is determined that the period from the current time to the scheduled landing time of the different UAV 1 at the landing area Ar is the predetermined period or less (step S5: YES), the processing proceeds to step S14. With the processing in step S5, in a case where the UAV 1 arrives before the processing of moving the partition is completed or before the UAV 1 is notified of the partial area corresponding to the moved partition in step S8 described later, it is possible to prevent the UAV 1 from landing on the partial area corresponding to the partition before the movement.

In step S6, the management server MS virtually moves the partition set for the different UAV 1 in the landing area Ar. Next, the management server MS performs reservation change processing of reserving a partial area corresponding to the partition moved in step S6 (reservation change) (step S7). In this reservation change processing, size information and position information correlated to the reservation information of the partial area reserved by the different UAV 1 before the movement of the partition are updated (that is, changed by moving the partition) (as for the reservation information, no change is made).

Next, the management server MS performs transmission processing of transmitting partial area change information including the position information of the partial area to the different UAV 1 whose partial area has been changed (step S8), and the processing proceeds to step S9. In this transmission processing, the partial area change information is transmitted to the different UAV 1 (may also be transmitted to the GCS or the UTMS 2) via the communication network NW. Incidentally, in a case where a plurality of partitions is moved in step S4, the processing from steps S5 to S8 is performed for each UAV 1 corresponding to each of the partitions. In step S5 of this case, in a case where it is determined that the distance to the landing area from the current position of each of the plurality of UAVs 1 whose partitions are to be moved is not the predetermined distance or less, the processing proceeds to step S6. Alternatively, in a case where it is determined that a period from the current time to scheduled landing time of each of the plurality of UAVs 1 is the predetermined period or less, the processing proceeds to step S6.

In step S9, the management server MS determines whether or not there is a plurality of partitions that can be set. When the management server MS determines that there is not the plurality of partitions that can be set (step S9: NO), the processing proceeds to step S11. On the other hand, in the case where the management server MS determines that there is the plurality of partitions that can be set (step S9: YES), the processing proceeds to step S10.

In step S10, the management server MS selects one partition from among the plurality of partitions that can be set, and the processing proceeds to step S11. For example, among the plurality of partitions that can be set, a partition closest to a partition already set or a partition including an end portion of the landing area Ar is selected. Incidentally, in a case where approach direction information is included in a reservation request, a partition closest to the approach direction indicated by the approach direction information is preferably selected from among the plurality of partitions that can be set.

In step S11, the management server MS sets a new partition for the UAV 1a related to the reservation request. That is, the partition retrieved in step S2 (in a case where the plurality of partitions is retrieved, the partition selected in step S10) is set as a new partition.

Incidentally, as described above, in the case where the reservation request is transmitted both before the start of the flight of the UAV 1a and during the flight of the UAV 1a (for example, when the UAV 1a arrives near the landing area Ar), the management server MS determines whether or not a partition is already set for the UAV 1a related to the reservation request before the processing in step S11. Then, in the case of determining that the partition is not set yet (that is, in the case of the provisional reservation request), the management server MS sets a new partition as described above (step S11).

On the other hand, in a case of determining that the partition is already set (that is, in the case of the formal reservation request), the management server MS resets, in the landing area, a new partition (that is, the partition retrieved in step S2) instead of the partition already set (step S11). At this time, the management server MS compares the partition already set with the new partition (that is, the partition retrieved in step S2) (for example, compares a position and a size), and sets a more suitable partition. In a case where the partition already set is a more suitable partition, the partition resetting is not performed (that is, the partition already set is kept as it is). On the other hand, in a case where the new partition is a more suitable partition, the new partition is set instead of the partition already set. According to this configuration, it is possible to set the more ideal partition for the UAV 1a (for example, no need to make a detour).

Next, the management server MS performs reservation processing of reserving a partial area corresponding to the partition set in step S11 (step S12). Incidentally, in the reservation processing of the case where the new partition is set instead of the partition already set, the size information and the position information correlated to the reservation information of the partial area provisionally reserved by the UAV 1a related to the reservation request are updated (that is, changed to a formal reservation).

Next, the management server MS performs transmission processing of transmitting, to the UAV 1a related to the reservation request, landing control information including the position information of the partial area reserved in step S12 (that is, transmission processing to make the UAV 1a land on the partial area) (step S13), and ends the processing illustrated in FIG. 9. Note that, in the transmission processing of the case where the new partition is set instead of the partition already set, the landing control information including the position information of the partial area formally reserved in step S12 is transmitted.

In step S14, the management server MS performs transmission processing of transmitting reservation failure information indicating that the partial area cannot be reserved for the UAV 1a related to the reservation request, and ends the processing illustrated in FIG. 9. In this transmission processing, the reservation failure information is transmitted to the different UAV 1 (may be transmitted to the GCS or the UTMS 2) via the communication network NW.

As described above, according to the above-described embodiment, the management server MS sets, in a predetermined landing area, a partition on the basis of information of a UAV 1 that lands on the landing area. The partition is obtained by virtually partitioning a part of the landing area, and the processing is performed to make the UAV 1 land on a partial area corresponding to the set partition, and therefore, the landing area in a port for landing of a plurality of UAVs 1 can be more efficiently utilized. In other words, according to the above-described embodiment, making a UAV 1 wait on a port or moving a UAV 1 to a different port can be diminished, and therefore, efficiency can be improved in viewpoints of battery power consumption and a waiting time of the UAV 1. Moreover, in a case where the UAV 1 is used for delivery of an article, movement of a recipient of the article can be diminished, and therefore, efficiency can be improved also in this point.

Figure 10:
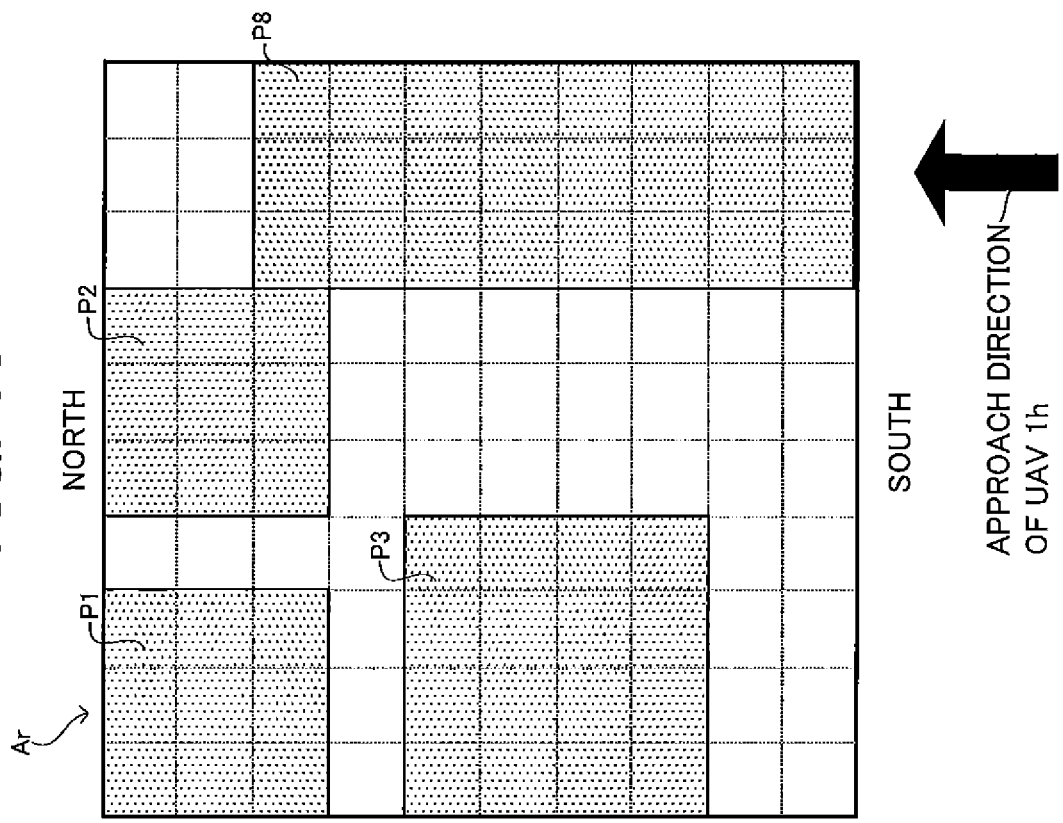
FIG. 10 is a conceptual diagram illustrating partitions set in a landing area Ar where landing of both a vertical landing type and a sliding landing type is allowed.

Incidentally, in the above-described embodiment, it is assumed that a landing type of a UAV 1 is a type of descending vertically from the sky above a landing area and then landing (hereinafter referred to as the "vertical landing type"), but the landing type of the UAV 1 is also applicable to a landing type of descending obliquely (in other words, sliding) from the sky above the landing area and then landing (hereinafter referred to as "sliding landing type"). In a case where a partial area is reserved by a UAV 1 in a landing area where landing of both the vertical landing type and the sliding landing type is allowed, a reservation request thereof includes a landing type of the UAV 1. In this case, the partition setting unit 33b identifies a plane size suitable for landing of the UAV 1 on the basis of specific information and the landing type of the UAV 1, and sets a partition according to the identified plane size in the landing area. For example, in a case where the landing type is the sliding landing type, the partition setting unit 33b identifies, as the plane size suitable for the landing of the UAV 1, a plane size including not only a portion according to the size or the like of the UAV 1 but also a portion for the UAV 1 to glide on the ground at the time of landing (the portion corresponding to a runway). FIG. 10 is a conceptual diagram illustrating partitions set in a landing area Ar where landing of both the vertical landing type and the sliding landing type is allowed. In the example of FIG. 10, a partition P8 is set for a UAV 1h of the sliding landing type. As illustrated in FIG. 10, in the partition PB, a length in an approach direction of the UAV 1h is set longer than a length in a direction perpendicular thereto. In a partial area corresponding to the partition P8, the UAV 1h glides on the ground at the time of landing and then stops. Incidentally, the partition setting unit 33*b* may reduce a plane size identified on the basis of specific information of the UAV 1 of the sliding landing type to a plane size in a case where the UAV 1 is subjected to headwind on the basis of weather information, and a partition according to the reduced plane size may be set in the landing area.

Figure 11:
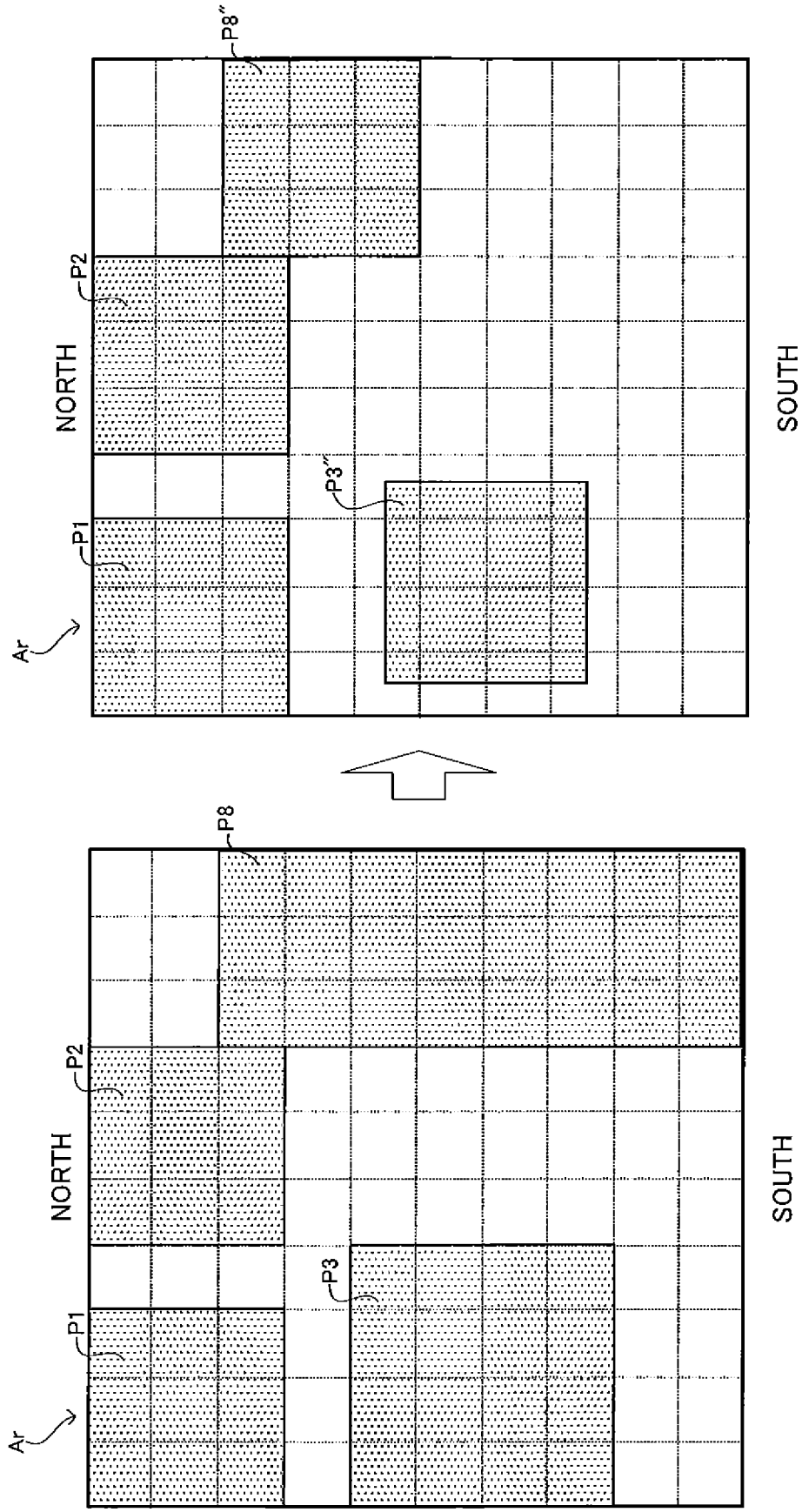
FIG. 11 is a conceptual diagram illustrating a state in which a set partition is reduced.

Moreover, in the above-described embodiment, the partition setting unit 33*b* may reduce a set partition in a case where a scheduled period from when the UAV 1 has landed on the partial area corresponding to the partition until the UAV 1 takes off (that is, a period from the landing time to the scheduled takeoff time) is a first predetermined period (e.g., 30 to 60 minutes) or more. With this configuration, in a case where a period during which the UAV 1 lands on the partial area is relatively long, reservation is changed from the partial area corresponding to the partition before the reduction to the partial area corresponding to the partition after the reduction. Therefore, the portion that has become available after the reduction can be released for landing of a different UAV 1 landing. FIG. 11 is a conceptual diagram illustrating a state in which a set partition is reduced. In an example of FIG. 11, a partition P3 set for a UAV 1*c* is reduced as a partition P3", and a partition P8 set for a UAV 1*h* is reduced as a partition P8". For example, the partitions for the UAV 1*c* and the UAV 1*h* are reduced respectively to land sizes necessary for these UAVs to stay in the places. However, in a case where the partition is thus reduced, it is necessary to secure an area required for takeoff until each of the UAVs 1 takes off. In particular, in a case where it is necessary to secure the area for gliding on the ground at the time of takeoff like the UAV 1*h* of the sliding landing type illustrated in FIG. 11, the reduced partition P8" is required to be enlarged up to the land size of the original partition P8 or enlarged by using a vacant portion when enlarged. Incidentally, the partition setting unit 33*b* preferably reduces a partition only for a time zone (time zone of the above-described first predetermined period or more) after a second predetermined period (e.g., 3 to 5 minutes) from when the UAV 1 has landed until a third predetermined period (e.g., 3 to 5 minutes) before the UAV 1 is scheduled to take off. Here, the second predetermined period is set considering a period from when the UAV 1 has landed until the UAV 1 is stabilized, and the third predetermined period is set considering a period required for takeoff preparation and the like. By this configuration, the portion that has become available due to the reduction can be released with a sufficient time for landing of a different UAV 1.

Figure 12:
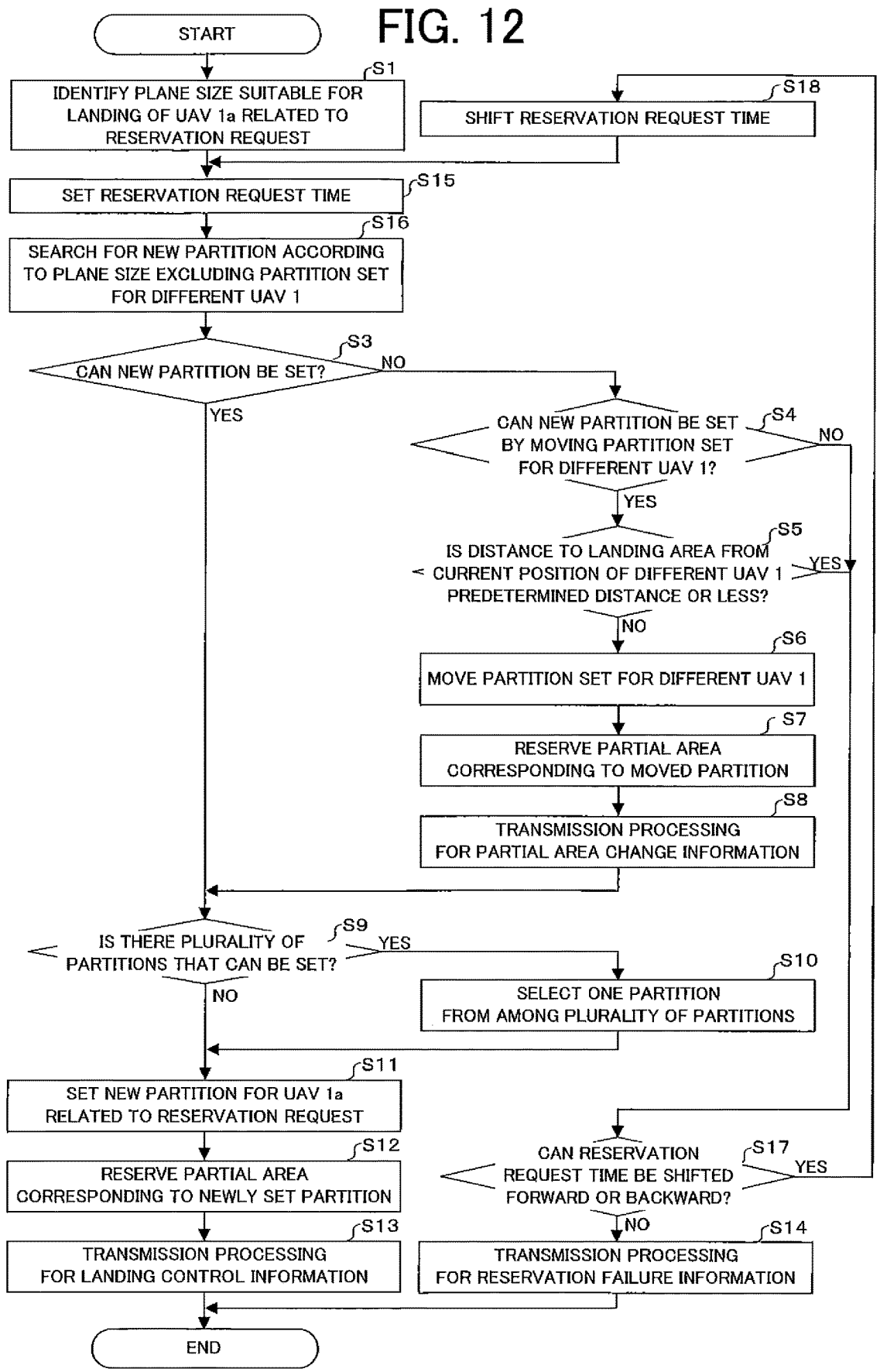
FIG. 12 is a flowchart illustrating a modified example of processing executed by a management server MS.

Moreover, in the above-described embodiment, in the example of FIG. 9, the management server MS makes a search for a new partition on the basis of a setting state of a partition at the time of receiving a reservation request (step S2), but may make a search for a new partition on the basis of a setting state of a partition at the time near reservation date and time (in future). FIG. 12 is a flowchart illustrating a modified example of processing executed by the management server MS and also is an exemplary case where the search for a new partition is made on the basis of the setting state of the partition at the time near the reservation date and time. In the example of FIG. 12, processing steps performed similar to those in FIG. 9 are denoted by the same reference signs. In FIG. 12, when the management server MS identifies a plane size suitable for landing of the UAV 1*a* (step S1), the management server sets a reservation request time (that is, the reservation request time reserved by the UAV 1*a* for landing) on the basis of reservation date and time included in the received reservation request (step S15). For example, the management server MS preferably sets, as the reservation request time, a reservation time zone (from start time to end time) or the start time on the reservation date. For example, the current time is 10:00, and the reservation time zone 15:00 to 16:00 that is seven hours thereafter is set as the reservation request time for a partition. This reservation request time is a search time for the partition. Then, the partition setting unit 33*b* of the management server MS searches the landing area Ar (that is, the landing area Ar as of the reservation request time) for a new partition according to the plane size identified in step S1, on the basis of the setting state of the partition in the landing area Ar as of the reservation request time set in step S15 (step S16), and the processing proceeds to step S3 and executes the processing subsequent thereto. According to this configuration, it is possible to respond to requests from the larger number of the UAVs 1, and a partition can be set in the landing area Ar for each future time zone.

Here, the setting state of the partition during the reservation request time is acquired (that is, predicted) by inputting, to a setting state prediction model, a reservation date, a reservation day of the week, and a reservation request time related to the received reservation request (current reservation request). The setting state prediction model is obtained by learning, for example, past reservation information (e.g., date, day of the week, time zone, etc.) (mechanical learning). Incidentally, the predicted setting state may be arrangement information of concrete partitions as illustrated in FIG. 7, information of partition sizes and the number of the partitions, information of a maximum partition size that can be reserved, a probability in which a large-sized partition may be reserved, or a simple congestion degree. For example, when a possibility that a large-sized partition may be reserved is low or when the predicted congestion degree is low, a partition is set in the most ideal arrangement for the UAV 1*a* related to the received current reservation request. On the other hand, when the possibility that a large-sized partition may be reserved is high or when the predicted congestion degree is high, a partition for the UAV 1*a* related to the current reservation request is set such that a wide space is made to remain or the partition is set adjacent to another partition so as to eliminate a useless space for a reservation request that may be received in future, even though convenience of the UAV 1*a* related to the received current reservation request is impaired. With this configuration, the processing of moving a partition described with reference to FIG. 8 is hardly performed. Incidentally, reservation availability may be determined on the basis of the current setting state regardless of the predicted setting state. In such a case, as far as there is sufficient room in the setting state of partitions already set, the reservation itself can be accepted despite a fact that, for example, the predicted congestion degree is high or a possibility that an extremely large-sized partition may be reserved is high although the reservation has not been made yet. Then, in this case, a search is made on the basis of the setting state in which only arrangement of partitions is predicted.

Moreover, in the example of FIG. 12, in the case where it is determined that a new partition cannot be set even though a partition that has been set for a different UAV 1 is moved (step S4: NO), or in the case where it is determined that the distance from the current position of the different UAV 1 to the landing area is the predetermined distance or less (step S5: YES), the processing proceeds to step S17. In step S17, the management server MS determines whether or not the reservation request time can be shifted (staggered) forward or backward. For example, in a case where a received reservation request includes a time range in which the reservation date and time can be shifted, it is determined that the reservation request time can be shifted forward or backward. Alternatively, the management server MS may transmit, to the UAV 1a related to the reservation request or the GCS, inquiry information to ask whether or not the reservation date and time can be shifted at the time of the processing in step S17, and in a case where information indicating a permission to shift the reservation date and time is received from the UAV 1a or the GCS, it may be determined that the reservation request time can be shifted forward or backward. Then, in a case of determining that the reservation request time can be shifted forward or backward (step S17: YES), the management server MS shifts the reservation request time within the time range in which the reservation request time can be shifted (step S18), and sets the shifted new reservation request time (step S15), and the processing proceeds to step S16. According to this configuration, a flexible action can be taken in response to a request from each UAV 1. Thus, in a case where the partition is set by shifting the reservation request time, the shifted reservation date and time is included in the reservation information stored in the reservation processing of step S12. On the other hand, in a case where the management server MS determines that the reservation request time cannot be shifted forward or backward (step S17: NO), the processing proceeds to step S14. Incidentally, the processing in step S17 may be performed in a case where it is determined in step S3 that a partition cannot be set in the landing area Ar (step S3: NO). That is, in a case where a new partition cannot be set because there are the partitions already set for the different UAVs 1, the partition setting unit 33b of the management server MS determines whether or not the reservation request time can be shifted forward or backward, and in a case of determining that the reservation request time can be shifted, the partition setting unit 33b shifts the reservation request time forward or backward and sets, on the basis of the setting state of the partitions in the landing area Ar, a new partition in the landing area Ar as of the shifted reservation request time.

Moreover, in the above-described embodiment, there is a case where the UAV 1 lands on the partial area corresponding to the set partition and is evacuated after unloading a loaded article on the partial area. In this case, the partition setting unit 33b may identify a size of the article recognized (sensed) in the partial area by a sensor such as a camera installed in a periphery of a port after evacuation of the UAV 1, and may reduce the partition on the basis of the size of the article. With this configuration, the portion that has become available due to the reduction can be released for landing of a different UAV 1. As for the size of the article, the size of the article recognized on the partial area can be identified (estimated) from the size of the partial area.

Incidentally, it should be noted that the foregoing embodiment is one embodiment of the present invention and does not limit the present invention accordingly; and any change, addition, or modification of the foregoing embodiment appropriately made within the spirit of the present invention will naturally fall within the technical scope of the present invention. For example, in the above-described embodiment, a plane size suitable for landing of a UAV 1 is identified and a partition according to the plane size is set in a landing area, but a partition can also be set in the landing area on the basis of specific information and the like of the UAV 1 instead of identifying the plane size suitable for landing of the UAV 1. For example, in a case where a size and a shape of the UAV 1 permitted to land on the landing area are fixed (that is, only a specific UAV 1 is permitted to land), a partition having the fixed size can be set by determining whether or not a UAV is the specific UAV 1 from an aircraft ID of the UAV 1 (also from a type or a model number thereof). Moreover, in the above-described embodiment, the management server MS has been described as an example of the landing management device, but the landing management device may also be the control unit 15 of each UAV 1.

REFERENCE SIGNS LIST

1 UAV
2 UTMS
3 PMS
11 Drive unit
12 Positioning unit
13 Radio communication unit
14 Imaging unit
15 Control unit
31 Communication unit
32 Storage unit
33 Control unit
33a Reservation request reception unit
33b Partition setting unit
33c Reservation processing unit
33d Transmission processing unit
MS Management server
S Unmanned aerial vehicle system

The invention claimed is:

1. A landing management device comprising:
   at least one memory configured to store program code; and at least one processor configured to access the program code and operate as instructed by the program code, the program code including:
   setting code configured to cause at least one of the at least one processor to set a partition, in a predetermined landing area, on the basis of information of an unmanned aerial vehicle that lands on the landing area, the partition being obtained by virtually partitioning a part of the landing area; and
   processing code configured to cause at least one of the at least one processor to perform processing to make the unmanned aerial vehicle land on a partial area corresponding to the partition,
   wherein in a case where a scheduled period from when the unmanned aerial vehicle has landed on the partial area corresponding to the partition until the unmanned aerial vehicle takes off is a first predetermined period or more, the setting code is further configured to cause at least one of the at least one processor to reduce the partition.

2. The landing management device of claim 1, wherein the setting code is further configured to cause at least one of the at least one processor to identify a plane size suitable for landing of the unmanned aerial vehicle on the basis of the information of the unmanned aerial vehicle, and to set the partition according to the plane size in the landing area.

3. The landing management device of claim 2,
   wherein the program code further includes acquisition code configured to cause at least one of the at least one processor to acquire weather information for an area corresponding to the landing area, and
   wherein the setting code is further configured to cause at least one of the at least one processor to identify the plane size based on the weather information.

4. The landing management device of claim 1, wherein the information of the unmanned aerial vehicle includes information of at least one of a shape, a size, a type, and a model number of the unmanned aerial vehicle.

5. The landing management device of claim 1, wherein the setting code is further configured to cause at least one of the at least one processor to set a new partition in the landing area so as not to overlap with a partition already set for a different unmanned aerial vehicle.

6. The landing management device according to claim 1, wherein in a case where a new partition cannot be set because there is a partition already set for a different unmanned aerial vehicle, the setting code is further configured to cause at least one of the at least one processor to-move the partition already set for the different unmanned aerial vehicle inside the landing area and sets a new partition in the landing area after the movement.

7. The landing management device of claim 6, wherein the setting code is further configured to cause at least one of the at least one processor to determine, on the basis of a current position or scheduled landing time on the landing area of the different unmanned aerial vehicle, whether or not to move the partition already set for the different unmanned aerial vehicle.

8. The landing management device of claim 1, wherein the setting code is further configured to cause at least one of the at least one processor to reduce the partition only for a time zone that is after a second predetermined period from when the unmanned aerial vehicle has landed until a third predetermined period before the unmanned aerial vehicle is scheduled to take off.

9. The landing management device of claim 1,
wherein the program code further includes acquisition code configured to cause at least one of the at least one processor to acquire a size of an article recognized in the partial area after the unmanned aerial vehicle has landed on the partial area corresponding to the partition and the unmanned aerial vehicle is evacuated, and
wherein the setting code is further configured to cause at least one of the at least one processor to reduce the partition on the basis of the size of the article.

10. The landing management device of claim 1, wherein in a case where a distance to the landing area from a current position of the unmanned aerial vehicle in flight becomes a predetermined distance or less, or in a case where a period from current time to scheduled landing time of the unmanned aerial vehicle on the landing area becomes a predetermined period or less, the setting code is further configured to cause at least one of the at least one processor to set the partition in the landing area.

11. The landing management device of claim 1, wherein a landing type of the unmanned aerial vehicle is a type in which the unmanned aerial vehicle can vertically land.

12. A landing management device comprising:
at least one memory configured to store program code; and at least one processor configured to access the program code and operate as instructed by the program code, the program code including:
setting code configured to cause at least one of the at least one processor to set a partition, in a predetermined landing area, on the basis of information of an unmanned aerial vehicle that lands on the landing area, the partition being obtained by virtually partitioning a part of the landing area; and
processing code configured to cause at least one of the at least one processor to perform processing to make the unmanned aerial vehicle land on a partial area corresponding to the partition,
wherein in a case where a distance to the landing area from a current position of the unmanned aerial vehicle in flight becomes a predetermined distance or less, or in a case where a period from current time to scheduled landing time of the unmanned aerial vehicle on the landing area becomes a predetermined period or less, the setting code is further configured to cause at least one of the at least one processor to reset a new partition in the landing area instead of the partition already set.

13. A landing management device comprising:
at least one memory configured to store program code; and at least one processor configured to access the program code and operate as instructed by the program code, the program code including:
setting code configured to cause at least one of the at least one processor to set a partition, in a predetermined landing area, on the basis of information of an unmanned aerial vehicle that lands on the landing area, the partition being obtained by virtually partitioning a part of the landing area; and
processing code configured to cause at least one of the at least one processor to perform processing to make the unmanned aerial vehicle land on a partial area corresponding to the partition,
wherein the setting code is further configured to cause at least one of the at least one processor to set a new partition in the landing area on the basis of a setting state of the partition in the landing area as of a reservation request time to be reserved by the unmanned aerial vehicle for landing.

14. The landing management device of claim 13, wherein in a case where the new partition cannot be set because there is a partition already set for a different unmanned aerial vehicle, the setting code is further configured to cause at least one of the at least one processor to shift the reservation request time forward or backward and to set the new partition in the landing area on the basis of a setting state of the partition in the landing area as of the shifted reservation request time.

* * * * *